United States Patent
Konarski

(10) Patent No.: US 9,080,084 B2
(45) Date of Patent: Jul. 14, 2015

(54) PHOTOLYTICALLY INDUCED REDOX CURABLE COMPOSITIONS

(71) Applicant: Henkel US IP LLC, Rocky Hill, CT (US)

(72) Inventor: Mark M. Konarski, Old Saybrook, CT (US)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 14/151,458

(22) Filed: Jan. 9, 2014

(65) Prior Publication Data

US 2014/0124134 A1 May 8, 2014

Related U.S. Application Data

(63) Continuation of application No. PCT/US2012/043433, filed on Jun. 21, 2012.

(60) Provisional application No. 61/511,285, filed on Jul. 25, 2011.

(51) Int. Cl.
*B32B 38/00* (2006.01)
*C09J 133/14* (2006.01)

(52) U.S. Cl.
CPC ..................... *C09J 133/14* (2013.01)

(58) Field of Classification Search
USPC .......... 156/273.3; 522/13, 24, 25, 29
See application file for complete search history.

(56) References Cited

U.S. PATENT DOCUMENTS

| | | |
|---|---|---|
| 3,855,040 A | 12/1974 | Malofsky |
| 4,018,851 A | 4/1977 | Baccei |
| 4,295,909 A | 10/1981 | Baccei |
| 4,309,526 A | 1/1982 | Baccei |
| 4,525,533 A | 6/1985 | Bertrand et al. |
| 4,533,446 A | 8/1985 | Conway et al. |
| 4,581,427 A | 4/1986 | Dunn et al. |
| 4,751,273 A | 6/1988 | Lapin et al. |
| 4,775,732 A | 10/1988 | Lapin |
| RE33,211 E | 5/1990 | Lapin et al. |
| 5,019,636 A | 5/1991 | Lapin et al. |
| 5,039,715 A | 8/1991 | Bachmann et al. |
| 5,139,872 A | 8/1992 | Lapin et al. |
| 6,632,908 B1 | 10/2003 | Maandi |
| 6,838,182 B2 | 1/2005 | Issari et al. |
| 2003/0162857 A1 | 8/2003 | Wojciak et al. |

FOREIGN PATENT DOCUMENTS

| | | |
|---|---|---|
| DE | 2025814 | 8/1971 |
| WO | 2004011848 A2 | 2/2004 |
| WO | 2006001928 A1 | 1/2006 |

OTHER PUBLICATIONS

International Search Report for PCT/US2012/043433, 3 pages.
Crivello and Lee "Alkoxy-Substituted Diaryliodonium Salt Cationic Photoinitiators" J. Poly Sci.: Part A., 27, 3951-68 (1989).

*Primary Examiner* — Vu A Nguyen
(74) *Attorney, Agent, or Firm* — Steven C. Bauman

(57) ABSTRACT

Photolytically induced redox curable compositions, which show a delayed onset of cure resulting in controllable "open times" for the end user consumer, are provided. These compositions are activated by exposure to electromagnetic radiation, such as UV/VIS radiation with a wavelength in the range of 254-470 nm, but show a commercially meaningful "open time" prior to cure. This property is particularly attractive when opaque substrates and/or substrates with low transmissivity are to be assembled.

11 Claims, 2 Drawing Sheets

PHOTOLYTICALLY INDUCED REDOX CURABLE COMPOSITIONS

BACKGROUND

1. Field

Photolytically induced redox curable compositions, which show a delayed onset of cure resulting in controllable "open times" for the end user consumer, are provided. These compositions are activated by exposure to electromagnetic radiation, such as UV/VIS radiation with a wavelength in the range of 254-470 nm, but show a commercially meaningful "open time" prior to cure. This property is particularly attractive when opaque substrates and/or substrates with low transmissivity are to be assembled.

2. Brief Description of Related Technology

Photoinitiated curable adhesive compositions based on epoxy resins have many benefits and advantages desirable to end user consumers. For example, such compositions provide cured products having physical properties comparable to those from a thermosetting composition (though without the application of heat necessary to cure such compositions which oftentimes may compromise the integrity of the substrate to be joined or other components thereon).

Photoinitiated adhesive compositions have, therefore, been used in various commercial applications such as a liquid crystal display and lamination in a digital video disk.

Photoinitiated, cationically curable epoxy resin compositions, which contain a ferrocenium complex salt, a compound containing cycloaliphatic epoxide groups as well as a mixture of polyethylene glycol and Y-butyrolactone as a solvent, have been disclosed in European Patent Document No. EP 344 910. The composition so disclosed is reported by intended for use for protective coatings and as a binder for magnetic particles or abrasives and as binders and in the printing industry.

Photoinitiated, cationically curable epoxy resin compositions, which contain trivalent phenols, an organic peroxide, a ferrocenium complex salt and a cycloaliphatic epoxy, are also known. See e.g. German Patent Document No. DE 20 25 814.

It is known that cure rate is dependent upon catalyst concentration and light intensity. For instance, page 3965 of J. V. Crivello and J. L. Lee, *J. Poly. Sci.: Part A*, 27, 3951-68 (1989) presents a table (reproduced below) that shows the effect of photoinitiator concentration on the UV cure of the epoxy, limonene dioxide (a cycloaliphatic epoxy).

| Photoinitiator | UV Cure Rate* | | | |
|---|---|---|---|---|
| Concentration (%) | 2 Lamps (300 W) | 1 Lamp (300 W) | 1 Lamp (200 W) | 1 Lamp (120 W) |
| 0.5 | >500 | 350 | — | 50 |
| 1.0 | >500 | >500 | — | 100 |
| 2.0 | >500 | >500 | >500 | 150 |
| 3.0 | >500 | >500 | >500 | 250 |

*Determined on a RPC UV Processor using 1 mil films on glass substrates; cure rates are in ft/min.

However, when these findings are used in practice to attempt to produce a delay in gellation (or increase in open time) in epoxy compositions, the relatively low level of active catalyst species becomes depleted by quenching reactions with trace contaminants and/or ambient moisture. This effect has been recognized by M. D. Soucek and J. Chen, *J. of Coatings Tech.*, 75, 937 (February 2003). See also FIG. 3 herein, which illustrates the lower level of percent cure.

International Patent Application No. PCT/US05/31567 is directed to and claims a photoinitiated cationically curable composition, comprising:
(a) an aliphatic epoxy resin, at least a portion of which includes an aliphatic glycidyl ether epoxy resin;
(b) a cationic photoinitiator; and
(c) a free radical initiator.

The use of epoxy-based compositions in this regard is oftentimes disfavored due in part to the yellowing that may be observed with such compositions and the heat of reaction generated by such compositions. The former can comprise aesthetics; the latter can comprise the integrity of the substrates being assembled.

U.S. Pat. No. 4,525,533 (Rooney) and U.S. Pat. No. 4,533,446 (Conway) are each directed to acrylate-based compositions. The '533 patent provides an acrylic monomer and a peroxy initiator, together with what is reported to be a ferrocenium salt. The '446 patent provides a photoactivatable anaerobic adhesive composition comprised of (a) an anaerobically curable acrylate ester monomer, (b) a compound of a certain structure which decomposes upon exposure to ultraviolet or visible light radiation to release a strong acid; (c) a peroxy free radical initiator capable of initiating the polymerization of the monomer in the substantial absence of oxygen, and (d) a ferrocenyl activator of anaerobic polymerization which in the presence of a strong acid reacts with the peroxide initiator to produce free radicals to catalyze the anaerobic polymerization of the monomer.

Despite the state of the technology, it would be desirable to provide end user consumers with a variety of alternative technologies with which to satisfy their product assembly needs, particularly when it comes to improving the open time of adhesives which gives end user consumers greater flexibility in their assembly procedures. In addition, it would be desirable to provide end user consumers with technologies that offer improved performance properties, such as shear strength.

To that end, there has been an on-going, long felt, but as of yet unmet, desire to find photoinitiated adhesive compositions, with an open time and a controllably delayed cure profile. Such a feature provides an open time and flexibility to the end user when designing processes for assemblying parts with such an adhesive composition.

SUMMARY

That on-going, long felt, but as of yet unmet, desire has now been achieved. In one aspect, the present invention seizes upon the discovery that use of an appropriate combination of a metallocene-containing photoinitiator, a peroxide and an acidic activator component allows for the formulation of a photolytically-induced curable RedOx composition with open time and delay cure onset. In this composition, the use of an appropriate metallocene-containing photoinitiator (such as a ferrocenium photoinitiator or ruthenium photoinitiator), peroxide and acidic activator component generates radiation free radicals that lead to a RedOx-induced cure of a RedOx curable component under exposure to UV radiation of the composition after a given period of time.

Thus, the invention provides a photolytically-induced RedOx curable composition, which includes a RedOx curable component having at least one vinyl ether, alkenyl ether, (meth)acrylate and combinations and mixtures thereof; a metallocene-containing photoinitiator; a peroxide and an acidic activator component. When exposed to appropriate radiation in the electromagnetic spectrum (such as UV/VIS in the range of 254-470 nm), the inventive compositions are capable of achieving an open time of from 1 second to about five minutes (before gelling occurs rendering it unsuitable for further assembly of parts), and developing greater than about 85% of its ultimate strength after a period of time of 24 hours at room temperature. Significantly, the inventive compositions may achieve greater than about 85% of their ultimate cure without exposure to elevated temperature conditions.

A particularly desirable composition within the scope of the invention includes a (meth)acylate component (such as hydroxypropyl(meth)acrylate), a metallocene-containing photonitiaor (such as a ferrocenium photoinitiator), a peroxide (such as t-butyl perbenzoate) and an acidic activator component (such as tocopherol, tannic acid, ascorbic acid, maleic acid, fumaric acid and citric acid and derivatives thereof and combinations thereof). The inventive compositions are capable of demonstrating significant improvement in open time or delayed cure characteristics and physical properties, such as shear strength on metals and plastic substrates.

The invention is also directed to methods of preparing such compositions, methods of using such compositions, assembling devices with such compositions, and reaction products of such compositions as well as the so-assembled devices.

DETAILED DESCRIPTION

Figure 1:
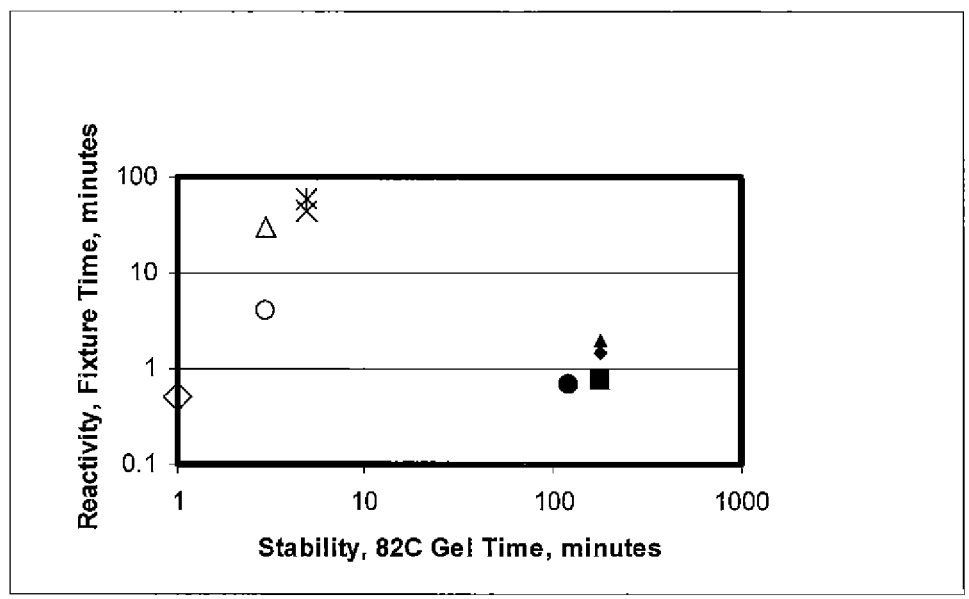
FIG. 1 depicts a plot of reactivity in terms of fixture time vs. stability after UV exposure, each measured in minutes.

The photolytically-induced curable RedOx compositions include a RedOx component having at least one vinyl ether, alkenyl ether, (meth)acrylate and combinations thereof; a metallocene-containing photoinitiator; a peroxide and an acidic activator component.

The vinyl ether may be a hybrid compound in that it includes at least one vinyl ether or 1-alkenyl ether group and at least one (meth)acrylate group. For instance, the vinyl ether may be represented by the following formula (I):

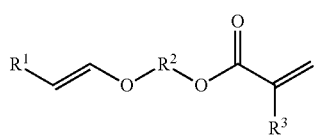

(I)

where $R^1$ is selected from hydrogen; aliphatic $C_{1-6}$ alkyl; $C_{1-6}$ cycloalkyl;

$R^2$ is selected from $C_{2-20}$ hydrocarbon diradical (such as $C_{2-20}$ alkylene) or polyalkylene oxide; and $R^3$ is selected from hydrogen or akyl, such as methyl.

Examples of suitable vinyl ethers include 2-(2'-vinyloxyethoxy)ethyl acrylate, 2-(2'-vinyloxyethoxy)ethyl methacrylate, 2-vinyloxyethyl acrylate, 2-vinyloxyethyl methacrylate, 2-(2'-prop-1-enyloxyethoxy)ethyl methacrylate, 2-(2'-prop-1-enyloxyethoxy)ethyl acrylate, and combinations thereof.

A variety of vinyl ether, alkenyl ether and/or (meth)acrylate hybrid compounds may be employed. In some embodiments, the hybrid compounds may be represented by the following formula:

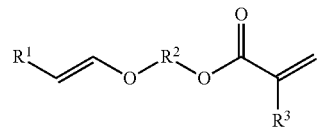

where $R^1$ is selected from hydrogen, $C_{1-6}$ alkyl and $C_{3-6}$ cycloalkyl;

$R^2$ is selected from $C_{2-20}$ alkylene; $C_{2-20}$ hydrocarbon diradical; and polyalkylene oxide; and $R^3$ is selected from hydrogen and methyl.

Examples of suitable reactive diluents include 2-(2'-vinyloxyethoxy)ethyl acrylate, 2-(2'-vinyloxyethoxy)ethyl methacrylate, 2-vinyloxyethyl acrylate, 2-vinyloxyethyl methacrylate, 2-(2'-prop-1-enyloxyethoxy)ethyl methacrylate, 2-(2'-prop-1-enyloxyethoxy)ethyl acrylate, and combinations thereof.

The (meth)acrylate component may include any conventional (meth)acrylate known to those skilled in the art. The (meth)acrylates may be mono-functional, di-functional or poly-functional. For example, the (meth)acrylate May be chosen from a wide variety of materials, such as those mono-functional (meth)acrylates represented by $H_2C=CGCO_2R^1$, where G may be hydrogen, halogen or alkyl groups having from 1 to about 4 carbon atoms, and $R^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Other (meth)acrylate monomers may also be used, such as reaction products of the diglycidylether of bisphenol-A with methacrylic acid and a (meth)acrylate ester corresponding to structure as shown below:

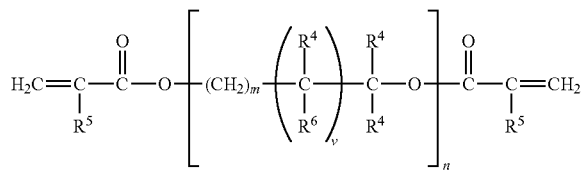

where $R^4$ may be selected from hydrogen, alkyl groups having from 1 to about 4 carbon atoms, hydroxyalkyl groups having from 1 to about 4 carbon atoms or

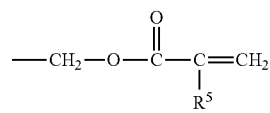

$R^5$ may be selected from hydrogen, halogen, and alkyl groups of from 1 to about 4 carbon atoms;

$R^6$ may be selected from hydrogen, hydroxy and

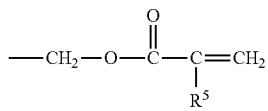

m is an integer equal to at least 1, e.g., from 1 to about 8 or higher, for instance, from 1 to about 4;

v is 0 or 1; and n is an integer equal to at least 1, e.g., 1 to about 20 or more.

Still other (meth)acrylate monomers that may be used herein include silicone (meth)acrylate moieties ("SiMA"), such as those taught by and claimed in U.S. Pat. No. 5,605,999 (Chu), the disclosure of which is hereby expressly incorporated herein by reference.

Additional (meth)acrylate monomers suitable for use herein include polyfunctional (meth)acrylate monomers, such as, but not limited to, di- or tri-functional (meth)acrylates like polyethylene glycol di(meth)acrylates, tetrahydrofuran(meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Poly-functional (meth)acrylates are desired when an increase in cross-link density is sought. A tri-functional urethane(meth)acrylate oligomer, more desirably an aliphatic polyether urethane tri(meth)acrylate, is a (meth)acrylate that is suitable to achieve that objective. An example of a suitable one is BR-990 (commercially available from Bomar Specialties, Co.), which is a urethane tri(meth)acrylate oligomer having a polyether backbone.

Another urethane(meth)acrylate oligomer that is useful herein is one having a polyethylene glycol center segment, about which are bisphenol A or F (which may or may not be hydrogenated) segments, capped with hydroxyl alkyl(meth) acrylate. Between each residue is a urethane linkage.

In some embodiments, the curable component may be a polyurethane oligomer or polyurethane block copolymer, which has (meth)acrylate, vinyl ether and/or alkenyl ether functionality.

More specifically, in that regard the curable component may be a polyurethane block copolymer having a backbone of alternating hard and soft segments and at least two ends. The ends each may be terminated with a vinyl ether, alkenyl ether or (meth)acrylate group. Such polyurethane block copolymers may be represented by the following general formula (II):

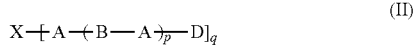

(II)

where A is a hard segment;
B is a divalent soft segment;
X is a q-valent soft segment;
D is a vinyl ether or (meth)acrylate group;
p is 0-10; and
q is 2-6.

In formula (II) above, A represents the hard segments. A may be the reaction product of a polyisocyanate and an aromatic, heterocyclic or cycloaliphatic polyol. Accordingly, A may be an aromatic, heterocyclic or cycloaliphatic segment derived from a polyisocyanate.

B and X, in formula (II) above, represent the soft segments. B and X may be a divalent and a multivalent group, respectively, derived from a polyether polyol, polyester polyol or hydrogenated hydrocarbon elastomer, such as polybutadiene.

As represented by D in formula (II), the polyurethane block copolymer may be terminated with vinyl ether groups or (meth)acrylate groups. Suitable vinyl ether compounds from which the vinyl ether terminal groups may be derived include hydroxy functional vinyl ethers. Examples of suitable compounds include, but are not limited to 2-hydroxyethyl vinyl ether, 4-hydroxybutyl vinyl ether, cyclohexanedimethanol monovinyl ether, diethylene glycol monovinyl ether, 1,6-hexanediol monovinyl ether and 3-aminopropyl vinyl ether.

Alternatively, the vinyl ether terminal groups may be derived from an amino functional vinyl ether, in which case vinyl ether urea capped polyurethanes may be obtained.

Such polyurethane block copolymers are illustrated by way of example in U.S. Patent Application Publication No. 2008/0139687 application entitled "Vinyl Ether/Acrylate Block Resins, Compositions And Methods of Making Same", which is incorporated by reference herein in its entirety.

Other suitable resins include those disclosed in U.S. Pat. Nos. 4,018,851, 4,295,909 and 4,309,526 to Baccei, and U.S. Pat. Nos. Re 33,211, 4,751,273, 4,775,732, 5,019,636 and 5,139,872 to Lapin et al., the contents all of which are incorporated by reference herein in their entirety. Combinations of any of the resins described above also may be incorporated into the compositions of the present invention.

The RedOx curable component may be present in amounts of about 20% to about 95% by weight of the composition. Desirably, the curable component is present in amounts of about 40% to about 70% by weight of the composition.

The compositions also include one or more metalocene photoinitiators. Desirably, the compositions cure upon exposure to UV, visible or UV/VIS light, i.e., irradiation at about 254-700 nm, desirably about 390-450 nm. The compositions also may be cured by exposure to other energy sources, such as heat.

As the metallocene-containing photoinitiator, appropriate choices include those having a ferrocenium cation, as shown below:

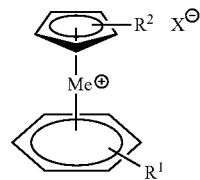

where M is Fe or Ru; and $R^1$ and $R^2$ may or may not each be present, but when present may individually be selected from alkyl, such as from 1 to 5 carbon atoms, halogen, hydroxyl or carboxyl.

Associated with the cations are counter ions, X, having a metal complex with the appropriate number of halogen atoms per metal atom, such as $PF_6^-$, $BF_4^-$, $AsF_6^-$ and $SbF_6^-$.

A specific example of such metallocene-containing photoinitiators having core cations include that represented by the structure below (available commercially under the tradename RGEN-261 from Chitec):

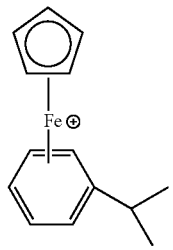

associated with a $PF_6^-$ anion.

The photoinitiator should be used in an amount up to about 5% by weight, such as about 0.01 to about 3% by weight, desirably about 0.5 to about 2% by weight of the composition.

These photoinitiators permit the inventive compositions to cure in a delayed manner, forming reaction products with tack free exterior surfaces.

The inclusion of such a photoinitiator broadens the energy sources available to cure the inventive composition. For instance, where such a photoinitiator is present, a LED device generating radiation in or about 470 mm may be used to cure the inventive compositions. Such a LED device is described for instance in International Patent Publication No. WO 04/011848 and International Patent Application No. PCT/US2005/016900, the disclosure of each of which being incorporated herein by reference.

It may also be desirable to include a photosensitizer in the composition, such as a thioxanthone, particularly when a ruthenium-containing photoinitiator is used.

As a peroxide, many examples exists. For instance, t-butyl peroxide is but one suitable choice. Other peroxides include cumene hydroperoxide and 1,t,3,3,-tetramethylbutyl hydroperoxide. The amount of the peroxide should be in the range of about 0.25 to about 5.0%, desirably, about 1.0 to about 2.0% by weight.

The acidic activator component may have a $pK_a$ of about 1.5 to about 15.0. Examples of suitable acidic activator components include (meth)acrylic acid; maleic acid; fumaric acid; cinnamic acid; cyanoacetic acid; barbituric acid; 1,3-dimethylbarbituric acid; malonic acid; methylmalonic acid; mono-ethyl malonate; 2-acetylcyclohexanone; ethyl cyanoacetate; acetylacetone; acetoacetic acid; ethyl acetoacetate; dihydroresorcinol; 1,3-diketones; 1,3,5-triketones; β-ketoesters, such as β-acetoacetates; ascorbic acid; citric acid; phenolic compounds; pyruvic acid; mono-ethyl fumarate; mono-butyl maleate; mono-2-(methacryloyloxy)ethyl maleate; tocopherol, tannic acid and derivatives and combinations thereof. The derivatives may be esters.

In certain embodiments, at least two, desirably three, of the noted possibilities for the acidic activator component should be introduced.

The acidic activator component may be present in an amount of about 0.1% to about 20% by weight of the composition. Desirably, the acidic activator component is present in amounts of about 0.5% to about 15%, more desirably about 1% to about 5% by weight of the composition.

An inorganic filler component may also be advantageously included in the inventive composition. For instance, the inorganic filler component may often include reinforcing silicas, such as fused silicas, and may be untreated or treated so as to alter the chemical nature of their surface. Virtually any reinforcing fused silica may be used. Alternatively, the inorganic filler component may be a fumed silica, which may impart thixotropy to the composition, and may be untreated or treated so as to alter the chemical nature of their surface.

Other desirable materials for use as the inorganic filler component include those constructed of or containing aluminum oxide, silicon nitride, aluminum nitride, silica-coated aluminum nitride and micronized quartz, provided they are not basic in nature.

The present invention also provides methods for bonding a pair or more of substrates, using the compositions so described. More specifically, one such method includes the steps of applying such a composition to at least one substrate, activating the composition prior to, during or after application thereof through exposure to radiation in the electromagnetic spectrum, such as UV radiation a wavelength in a range of 254-470 nm, to such an extent that a desired initial tackiness is maintained and no skin formation on the surface of the composition occurs; positioning the one substrate onto the other substrate; and allowing the composition to cure to bond the pair or more substrates, and optionally, enhancing cure speed of the composition by exposure to a temperature between about 30 and about 150° C., such as about 50 to about 100° C.

In the bonding method provided herein, at least one of the substrates to be bonded may have less than 50% optical transmission. Such substrates may be colored and/or opaque. The steps of this method include providing a first substrate, providing a second substrate, where at least one of the first and second substrates has less than 50% optical transmission, providing the inventive composition on at least one of the first or second substrates, exposing the composition to conditions sufficient to initiate cure thereof, mating the first and second substrates, and allowing the composition to achieve greater than 85% of its ultimate strength.

As noted, the inventive compositions are capable of achieving an open time of from 1 second to about 10 minutes (before gelling occurs rendering it unsuitable for adhesive applications), and developing greater than about 85% of its ultimate cure after a period of time of 24 hours at room temperature.

The following examples are presented to further illustrate the invention, without intending to narrow or depart from its scope.

EXAMPLES

Fifteen samples based on a curable component of a urethane(meth)acrylate oligomer, hydroxy propyl(meth)acrylate and triethylene glycol(meth)acrylate were prepared with one or more of a metallocene-containing photoinitiator; a peroxide; and an acidic activator component to illustrate comparative physical properties of the composition, such as cure profile and stability. Tables 1-5 show the fifteen samples in groups of three by their substituents in their relative amounts.

TABLE 1

| Component | | Sample/Amt. (parts) | | |
|---|---|---|---|---|
| Type | Identity | A | B | C |
| (Meth)acrylate | Urethane MA Oligomer⁺ | 8 | 8 | 8 |
| | HPMA | 6.7 | 6.7 | 6.7 |
| | TRIEGMA | 1.5 | 1.5 | 1.5 |
| Photoinitiator | IRGACURE 261* | 0.2 | 0.2 | 0.2 |
| | Ferrocene | — | — | — |
| | RHODOSIL 2014✓ | — | — | — |

TABLE 1-continued

| Type | Component Identity | Sample/Amt. (parts) A | B | C |
|---|---|---|---|---|
| | Ruthenium catalyst⁻ | — | — | — |
| Peroxide | t-Butyl peroxide | 0.4 | .4 | 0.4 |
| Acidic Activator | Tannic acid | — | — | — |
| | Tocopherol | — | — | — |
| | Ascorbyl palmitate | — | — | 0.01 |
| Additives | Chelator§ | 0.1 | 0.1 | 0.1 |
| | HEMA Maleate | 2.5 | 2.5 | 2.5 |
| | Thioxanthone | — | — | — |

*Ferrocenium-containing metallocene photoinitiator
✓Diaklyl Iodonium-BF₄ salt
§1-Hydroxy ethylidene-1,1-diphosphoric acid
⁺HEMA[IPDI]Bisphenol-A[IPDI]PEG[IPDI]Bisphenol-A[IPDI]HEMA
⁻Ruthenium-containing metalleocene photoinitiator

TABLE 2

| Type | Component Identity | Sample/Amt. (parts) D | E | I |
|---|---|---|---|---|
| (Meth)acrylate | Urethane MA Oligomer⁺ | 8 | 8 | 8 |
| | HPMA | 6.7 | 6.7 | 6.7 |
| | TRIEGMA | 1.5 | 1.5 | 1.5 |
| Photoinitiator | IRGACURE 261* | 0.2 | 0.2 | 0.2 |
| | Ferrocene | — | — | — |
| | Rhodosil 2014✓ | — | — | — |
| | Ruthenium catalyst⁻ | — | — | — |
| Peroxide | t-Butyl peroxide | 0.4 | 0.4 | 0.4 |
| Acidic Activator | Tannic acid | — | — | — |
| | Tocopherol | — | — | 0.2 |
| | Ascorbyl palmitate | 0.2 | 0.05 | — |
| Additives | Chelator§ | 0.1 | 0.1 | 0.1 |
| | HEMA Maleate | 2.5 | 2.5 | 2.5 |
| | Thioxanthone | — | — | — |

*Ferrocenium-containing metallocene photoinitiator
✓Diaklyl Iodonium-BF₄ salt
§1-Hydroxy ethylidene-1,1-diphosphoric acid
⁺HEMA[IPDI]Bisphenol-A[IPDI]PEG[IPDI]Bisphenol-A[IPDI]HEMA
⁻Ruthenium-containing metalleocene photoinitiator

TABLE 3

| Type | Component Identity | Sample/Amt. (parts) J | K | L |
|---|---|---|---|---|
| (Meth)acrylate | Urethane MA Oligomer⁺ | 8 | 8 | 8 |
| | HPMA | 6.7 | 6.7 | 6.7 |
| | TRIEGMA | 1.5 | 1.5 | 1.5 |
| Photoinitiator | IRGACURE 261* | 0.2 | 0.2 | 0.2 |
| | Ferrocene | — | — | — |
| | Rhodosil 2014✓ | — | — | — |
| | Ruthenium catalyst⁻ | — | — | — |
| Peroxide | t-Butyl peroxide | 0.4 | 0.4 | 0.4 |
| Acidic Activator | Tannic acid | — | — | — |
| | Tocopherol | 0.4 | 0.3 | 0.3 |
| | Ascorbyl palmitate | — | 0.01 | 0.05 |
| Additives | Chelator§ | 0.1 | 0.1 | 0.1 |
| | HEMA Maleate | 2.5 | 2.5 | 2.5 |
| | Thioxanthone | — | — | — |

*Ferrocenium-containing metallocene photoinitiator
✓Diaklyl Iodonium-BF₄ salt
§1-Hydroxy ethylidene-1,1-diphosphoric acid
⁺HEMA[IPDI]Bisphenol-A[IPDI]PEG[IPDI]Bisphenol-A[IPDI]HEMA
⁻Ruthenium-containing metalleocene photoinitiator

TABLE 4

| Type | Component Identity | Sample/Amt. (parts) M | N | O |
|---|---|---|---|---|
| (Meth)acrylate | Urethane MA Oligomer⁺ | 8 | 8 | 8 |
| | HPMA | 6.7 | 6.7 | 6.7 |
| | TRIEGMA | 1.5 | 1.5 | 1.5 |
| Photoinitiator | IRGACURE 261* | 0.2 | 0.2 | 0.2 |
| | Ferrocene | — | — | — |
| | Rhodosil 2014✓ | — | — | — |
| | Ruthenium catalyst⁻ | — | — | — |
| Peroxide | t-Butyl peroxide | 0.4 | 0.4 | 0.4 |
| Acidic Activator | Tannic acid | 0.1 | 0.1 | 0.1 |
| | Tocopherol | 0.3 | — | — |
| | Ascorbyl palmitate | 0.5 | — | 0.05 |
| Additives | Chelator§ | 0.1 | 0.1 | 0.1 |
| | HEMA Maleate | 2.5 | 2.5 | 2.5 |
| | Thioxanthone | — | — | — |

*Ferrocenium-containing metallocene photoinitiator
✓Diaklyl Iodonium-BF₄ salt
§1-Hydroxy ethylidene-1,1-diphosphoric acid
⁺HEMA[IPDI]Bisphenol-A[IPDI]PEG[IPDI]Bisphenol-A[IPDI]HEMA
⁻Ruthenium-containing metalleocene photoinitiator

TABLE 5

| Type | Component Identity | Sample/Amt. (parts) F | G | H |
|---|---|---|---|---|
| (Meth)acrylate | Urethane MA Oligomer⁺ | 8 | 8 | 8 |
| | HPMA | 6.66 | 6.66 | 6.66 |
| | TRIEGMA | 1.5 | 1.5 | 1.5 |
| Photoinitiator | IRGACURE 261* | — | — | — |
| | Ferrocene | 0.2 | 0.2 | — |
| | Rhodosil 2014✓ | 0.3 | 0.3 | — |
| | Ruthenium catalyst⁻ | — | — | 0.2 |
| Peroxide | t-Butyl peroxide | 0.4 | 0.4 | 0.4 |
| Acidic Activator | Tannic acid | — | — | 0.1 |
| | Tocopherol | — | 0.4 | 0.2 |
| | Ascorbyl palmitate | — | — | 0.04 |
| Additives | Chelator§ | 0.1 | 0.1 | 0.1 |
| | HEMA Maleic anhydride | 2.5 | 2.5 | 2.5 |
| | Thioxanthone | — | — | 0.04 |

*Ferrocenium-containing metallocene photoinitiator
✓Diaklyl Iodonium-BF₄ salt
§1-Hydroxy ethylidene-1,1-diphosphoric acid
⁺HEMA[IPDI]Bisphenol-A[IPDI]PEG[IPDI]Bisphenol-A[IPDI]HEMA
⁻Ruthenium-containing metalleocene photoinitiator The samples were prepared using conventional techniques, and later dispensed onto steel substrates.

Tables 6-9 below show the physical properties, in terms of visual observations, fixture time and stability recorded for each sample. Various conclusions may be drawn from the fifteen samples and the observations recorded. Initially, when starting with the basic formulation as set forth in Sample A, and adding t-butyl peroxide to form Sample B, a slow reaction was observed, with fixture speed observed to be greater than 30 minutes.

TABLE 6

| Physical Property | Sample A | B | C | D | E |
|---|---|---|---|---|---|
| Fixture time* | — | >30 min | 90 sec | 60 sec | 45 sec |
| Stability @ 82° C. | >3 hrs | 100 min | 25 min | 15 min | 5 min |

*After a 9 second exposure from a LOCTITE CUREJET @ 405 nm from 2 inches

To Sample B was added various constituents of the acidic activator component. For instance, in Samples C-E, ascorbyl acid (in the form of ascorbyl palmitate) was added at 0.01, 0.02 and 0.05 parts, respectively. The addition of ascorbyl palmitate improved fixture time (with the improvement increasing with the increased level of ascorbyl palmitate), but stability was compromised in proportion to the addition. See Table 6 for details.

TABLE 7

| Physical Property | Sample | |
|---|---|---|
|  | I | J |
| Fixture Time* | 2 min | 90 sec |
| Stability @ 82° C. | >3 hrs | >3 hrs |

*After a 9 second exposure from a LOCTITE CUREJET @ 405 nm from 2 inches

To Sample B was next added tocopherol alone at 0.2 and 0.4 parts to form Samples I and J, respectively. There, compared to Sample B, improved fixture times and stability were observed. See Table 7 for details.

TABLE 8

| Physical Property | Sample | | |
|---|---|---|---|
|  | K | L | M |
| Fixture time* | 60 sec | 40 sec | 45 sec |
| Stability @ 82° C. | 2 hrs | 2 hrs | 3 hrs |

*After a 9 second exposure from a LOCTITE CUREJET @ 405 nm from 2 Inches

To Sample B was next added each of ascorbyl palmitate and tocopherol to form Samples K-M. Tocopherol was added at a constant level of 0.3 parts, while in Sample K ascorbyl palmitate was added at a level of 0.01 parts; in Samples L and M ascorbyl palmitate was added at a level of 0.05 parts. To Sample M however tannic acid at a level of 0.1 parts was also added. Ascorbyl palmitate improved fixture times, though a sacrifice in stability was observed. The stability was improved by the addition of tannic acid without impacting dramatically the fixture time. See Table 8 for details.

TABLE 9

| Physical Property | Sample | | | | |
|---|---|---|---|---|---|
|  | N | O | F | G | H |
| Fixture time* | >30 min | 45 sec | >30 min | >30 min | 60 sec |
| Stability @ 82° C. | >3 hrs | 1 hr | <5 min | <20 min | 2 hr |

*After a 9 second exposure from a LOCTITE CUREJET @ 405 nm from 2 inches

In Sample N, tannic acid was added to Sample B. There, slow fixture speed was observed.

In Sample F, ferrocene at a level of 0.2 parts was used instead of the ferrocenium salt. This formulation was based on the chemistry shown in the Conway patent. Slow fixture times and lack of stability were observed, when compared to Sample B.

Sample G was prepared by adding tocopherol at a level of 0.4 parts to Sample F. Fixture time remained slow, though a modest improvement in stability was observed.

In Sample H, a ruthenium catalyst was used instead of the ferrocene from Sample F and thioxanthone at a level of 0.04 parts was added too. (No reaction was observed in a sample otherwise comparable to Sample H, but without the thioxanthone.) Here, fixture time and stability improved over Sample F. Indeed, the recorded performance was comparable to Sample K. See Table 9 for details.

Next, in Table 10 below, additional samples were prepared to replicate formulations disclosed in the '533 patent and the '446 patent. In addition, while not illustrated in Table 10, a system representative of U.S. Pat. No. 3,855,040 (Malofsky) is also shown as data in FIG. 1 (represented as the hollow diamond). That system—which is intended for use in a two step manner; i.e., a primer part laid down on a substrate followed by a resin part—contains once combined PEGMA (18.75 parts), CHP (0.8 parts), ferrocene (0.05 parts) and p-toluene sulfonic acid (0.4 parts).

TABLE 10

| Component | | Sample/Amt. (parts) | | | |
|---|---|---|---|---|---|
| Type | Type | P | Q | R | S |
| (Meth)acrylate | Urethane MA Oligomer[+] | 7.88 | 6 | — | — |
|  | HPMA | 5.265 | 5.865 | — | — |
|  | TRIEGMA | 1.48 | 1.5 | 20 | 20 |
|  | Flex Resin[&] | — | 2 | — | — |
| Photoinitiator | Ferrocene | — | — | 0.2 | 0.2 |
|  | Ferrocenium catalyst[#] | 0.15 | 0.15 | — | — |
| Peroxide | t-Butyl peroxide | 0.39 | 0.4 | — | — |
|  | CHP | — | — | 0.4 | 0.4 |
| Acidic Activator | Tannic acid | 0.1 | 0.12 | — | — |
|  | Tocopherol | 0.39 | 0.4 | — | — |
|  | Ascorbyl palmitate | 0.04 | 0.04 | — | — |
| Additives | HEMA Maleate | 1.97 | — | — | — |
|  | Chelator[§] | 0.15 | 0.15 | — | — |
|  | HEMA Phosphoric acid | 0.015 | 0.015 | — | — |
|  | Glycidoxypropyl trimethoxy silane, SILQUEST A-187 | — | 0.18 | — | — |
|  | Triphenylcarbenium SbCl$_6$ | — | — | 0.0002 | 0.001 |
|  | Acrylic acid | 0.2 | — | — | — |
|  | Methacrylic acid | 1.77 | 3 | — | — |
|  | Maleic acid | 0.2 | 0.18 | — | — |

[&] oligomer comprised of tri-functional polypropyleneoxide, which is (meth)acrylate-capped with toluenediisocyanate and HPMA
[#] RGEN-261 SbF$_6$, Chitec
[§] 1-Hydroxy ethylidene-1,1-diphosphoric acid
[+] HEMA[IPDI]Bisphenol-A[IPDI]PEG[IPDI]Bisphenol-A[IPDI]HEMA

TABLE 11

| Physical Property | Sample | | | |
|---|---|---|---|---|
|  | P | Q | R | S |
| Fixture time* | — | — | 4 min | >30 min |
| Stability @ 82° C. | — | — | <3 min | <3 min |

*After a 9 second exposure from a LOCTITE CUREJET @ 405 nm from 2 Inches

With reference to FIG. 1, it may be seen that formulations represented by the solid geometric objects (i.e., Samples L, M, J and I) have a fixture time of about 1 minute and are stable for over 100 minutes at a temperature of 82° C. This may be contrasted with Samples F, G, R, S and T, which are representations of known formulations, according to the '533 patent, the '446 patent and the '040 patent.

Figure 2:
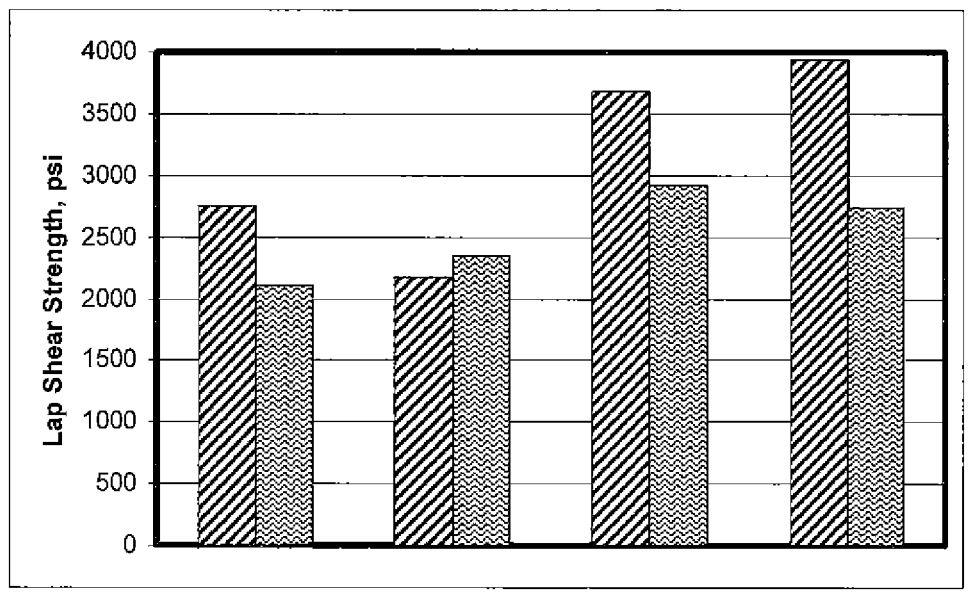
FIG. 2 depicts a bar chart on steel and stainless steel substrates of lap shear strengths of two comparative samples, in the form of two part acrylic products, and two formulations within the scope of the present invention.
Figure 3:
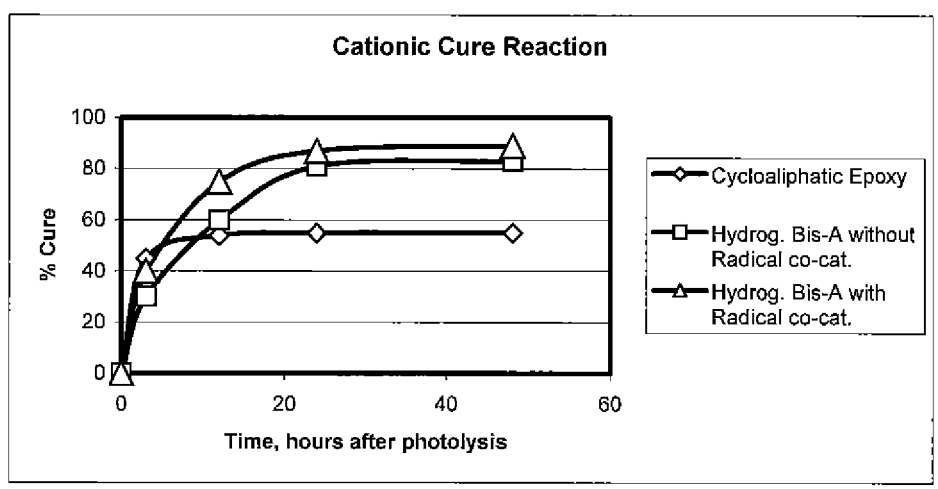
FIG. 3 depicts a plot of cationic cure reactivity over time of a comparative sample based on a cycloaliphatic epoxy resin and formulations within the scope of the present invention.

And with reference to FIG. 2, it may be seen that for each set of the four sets of two bars (the left of which representing steel and the right of which representing stainless steel), lap shear strength is being measured. The first two sets of two bars represent steel and stainless steel lapshears bonded together with commercially available two-step acrylic adhesives—LOCTITE 324 and LOCTITE 352. The third and fourth sets of two bars represent formulations within the scope of the invention—Samples P and Q, respectively.

What is claimed is:

1. A photolytically induced RedOx curable composition, comprising:
   (a) a RedOx curable component selected from vinyl ethers, alkenyl ethers, (meth)acrylates and combinations thereof;
   (b) a metallocene-containing photoinitiator;
   (c) a peroxide; and
   (d) an acidic activator component.

2. The composition of claim 1, wherein the photoinitiator is selected from the group consisting of ferrocenium- and ruthenium-containing photoinitiators.

3. The composition of claim 1, wherein the peroxide is t-butyl perbenzoate.

4. The composition of claim 1, wherein the acidic activator component is a member selected from the group consisting of (meth)acrylic acid; maleic acid; fumaric acid; cinnamic acid; cyanoacetic acid; barbituric acid; 1,3-dimethylbarbituric acid; malonic acid; methylmalonic acid; mono-ethyl malonate; 2-acetylcyclohexanone; ethyl cyanoacetate; acetylacetone; acetoacetic acid; ethyl acetoacetate; dihydroresorcinol; 1,3-diketones; 1,3,5-triketones; β-ketoesters; ascorbic acid; citric acid; phenolic compounds; pyruvic acid; mono-ethyl fumarate; mono-butyl maleate; mono-2-(methacryloyloxy)ethyl maleate; tocopheol, tannic acid and derivatives and combinations thereof.

5. The composition of claim 1, wherein the composition cures within a period of time of 30 seconds to 10 minutes after exposure to UV-radiation at a wavelength of 254 to 470 nm.

6. The composition according to claim 1, wherein the acidic activator component comprises one or more of ascorbic acid or derivative thereof and tocopherol.

7. The composition according to claim 1, wherein the acidic activator component comprises the combination of ascorbic acid or derivative thereof, tocopherol and tannic acid.

8. The composition according to claim 1, wherein the photoinitiator is represented by

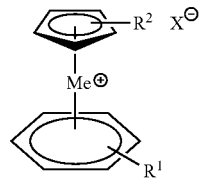

wherein Me is Fe or Ru; $R^1$ and $R^2$ may or may not be present, but when present may individually be selected from the group consisting of alkyl of from 1 to 5 carbon atoms, halogen, hydroxyl, and carboxyl; and X is an anion.

9. The composition according to claim 1, wherein the photoinitiator has a core cation represented by

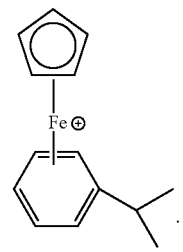

10. The composition according to claim 1, wherein the photoinitiator is used in an amount within the range of about 0.1 to about 2 percent by weight of the total composition.

11. A method for attaching one substrate to another substrate, comprising the steps of:
   applying a composition according to claim 1 to a first substrate;
   activating the composition prior to or after application thereof through exposure to radiation in the electromagnetic spectrum; and
   positioning the other substrate onto the first substrate; and
   optionally, curing the composition at a temperature between 60 and 140° C.

* * * * *